United States Patent
Gustafsson et al.

(10) Patent No.: US 10,194,334 B2
(45) Date of Patent: Jan. 29, 2019

(54) METHODS AND NODES IN A WIRELESS COMMUNICATION NETWORK

(71) Applicant: Huawei Technologies Co., Ltd., Shenzhen (CN)

(72) Inventors: Mattias Gustafsson, Kista (SE); Mats Hogberg, Kista (SE)

(73) Assignee: Huawei Technologies Co., Ltd, Shenzhen (CN)

( * ) Notice: Subject to any disclaimer, the term of this patent is extended or adjusted under 35 U.S.C. 154(b) by 67 days.

(21) Appl. No.: 15/403,564

(22) Filed: Jan. 11, 2017

(65) Prior Publication Data
US 2017/0127296 A1    May 4, 2017

Related U.S. Application Data

(63) Continuation of application No. PCT/EP2014/064919, filed on Jul. 11, 2014.

(51) Int. Cl.
*H04B 7/06* (2006.01)
*H04W 16/28* (2009.01)
*H04B 7/0413* (2017.01)
*H04B 7/0491* (2017.01)
*H04W 88/08* (2009.01)

(52) U.S. Cl.
CPC .......... *H04W 16/28* (2013.01); *H04B 7/0413* (2013.01); *H04B 7/0491* (2013.01); *H04B 7/0617* (2013.01); *H04W 88/08* (2013.01)

(58) Field of Classification Search
CPC .... H04W 16/28; H04W 88/08; H04B 7/0617; H04B 7/0413; H04B 7/0491

USPC ......................................................... 455/446
See application file for complete search history.

(56) References Cited

U.S. PATENT DOCUMENTS

| | | |
|---|---|---|
| 5,771,017 A | 6/1998 | Dean et al. |
| 7,427,953 B2 | 9/2008 | Chiang et al. |
| 2009/0232240 A1 | 9/2009 | Lakkis |
| 2009/0289737 A1* | 11/2009 | Itoh .................. H01P 5/222 333/120 |
| 2011/0319120 A1 | 12/2011 | Chen et al. |
| 2012/0300682 A1 | 11/2012 | Hartenstein |
| 2013/0077705 A1 | 3/2013 | Thomas et al. |

FOREIGN PATENT DOCUMENTS

| | | |
|---|---|---|
| EP | 2117075 A1 | 11/2009 |
| WO | 2015036012 A1 | 3/2015 |

* cited by examiner

*Primary Examiner* — Eugene Yun
(74) *Attorney, Agent, or Firm* — Slater Matsil, LLP

(57) ABSTRACT

A Base Transceiver Station (BTS) and a method for wireless communication with a User Equipment (UE) in a wireless communication system. The BTS comprises a Multiple Input Multiple Output (MIMO) antenna array configured for beamforming and MIMO transmission. The BTS further comprises a processing circuit, configured for supporting same or separate downlink precoding for a control plane and a user plane by modifying phase excitation of the MIMO antenna array and causing a transceiver to create an antenna beam by providing different phase for each antenna element of the MIMO antenna array. The BTS also comprises a transceiver, configured for transmitting a signal in the antenna beam via the MIMO antenna array, to be received by the UE.

18 Claims, 14 Drawing Sheets

METHODS AND NODES IN A WIRELESS COMMUNICATION NETWORK

CROSS-REFERENCE TO RELATED APPLICATIONS

This application is a continuation of International Application No. PCT/EP2014/064919, filed on Jul. 11, 2014, which application is hereby incorporated herein by reference.

TECHNICAL FIELD

Implementations described herein relate generally to a Base Transceiver Station (BTS) and a method in a BTS. It is further herein described a BTS system solution comprising an antenna solution and a MIMO transceiver architecture that creates a possibility to arrange beams of a MIMO antenna in flexible ways, both for defining cell coverage and for MIMO antenna beams.

BACKGROUND

Normally, base station antennas are limited in beam forming abilities by the fact that they only are configured to radiate their beam in one particular direction. The antenna coverage is normally either sector or omni depending of the antenna type chosen. Typical sector antennas are patch antennas. Typical omni antennas are dipole antennas. Traditional base stations with sector beam antennas integrated need to be mechanically orientated to direct the antenna sector beam toward wanted coverage area.

Typically, installations of antennas for base transceiver stations may comprise either sector antennas that are integrated in the front of the base transceiver station, or omni antennas, which are mounted on the top or the bottom of the base transceiver station.

Such traditional base station antenna solutions can work quite well for many scenarios, but they are not very flexible. One would not install the omni antenna on the base transceiver station on a site where coverage is needed just in a limited spatial region, it would be much more suitable there to use the sector antenna solution. Moreover, the sector antenna normally has its maximum directivity directed in the direction normal to the front side of the base transceiver station. Since the base transceiver station normally is installed on a wall this implies a problem, since the sector beam of the base transceiver station then is bound to radiate in a direction normal to the wall surface; a limitation that is not always positive. To direct the beam in other direction than from the wall, the base station need to be mechanical tilted towards wanted direction of coverage. Indeed, attempts have been made to create beam-steering functionalities on flat panel sector antennas, but the beam-steering abilities achieved are quite limited due to the constraints of the flat antenna architecture.

It appears that base station antennas require further development for improved flexibility and adaptivity to requirements within a cell.

SUMMARY

It is therefore an object to obviate at least some of the above mentioned disadvantages and to improve the performance in a wireless communication network.

According to a first aspect, the object is achieved by a Base Transceiver Station (BTS). The BTS is configured for wireless communication with a User Equipment (UE) in a wireless communication system. The BTS comprises a Multiple Input Multiple Output (MIMO) antenna array configured for beamforming and MIMO transmission. The BTS further comprises a processing circuit, configured for supporting same or separate downlink precoding for control plane and user plane by modifying phase excitation of the MIMO antenna array and causing a transceiver to create an antenna beam by providing different phase for each antenna element of the MIMO antenna array. Also the BTS comprises a transceiver, configured for transmitting a signal in the antenna beam via the MIMO antenna array, to be received by the UE.

Thereby, a flexible site deployment for different environments is enabled with one BTS type. Another advantage is that the BTS supports many types of possible site deployment and environments with the configurable downlink cell pattern to cover a wanted area and minimize the downlink interference with neighbouring cells. Thereby, the BTS may be mounted on a pole or wall and the downlink cell pattern may be selected to fit the mounting deployment and the environment the BTS is desired to cover.

By providing highly directional beamforming transmission, the link budget is improved which increases the signal to noise ratio as perceived by the UE, but also expand the range of the transmitted downlink signal, both open-space and for indoor penetration.

Furthermore, the beamforming of the BTS overcomes external and internal interference, e.g., Co-Channel Interference (CCI) by exploiting the spatial properties of the antenna array. Since the interference comes from a certain direction, the beamforming BTS can apply less energy towards the interferer, cancelling it out, in some cases.

A further advantage comprises increased network efficiency. By significantly reducing the interference, the BTS beamforming can allow much denser deployments than e.g. single antenna systems. Thanks to higher link budget, the likelihood of running high-order modulations (64 QAM, 16 QAM) is much higher even at the edges of the cell. Overall system capacity is thereby greatly improved.

In a first possible implementation of the BTS according to the first aspect, the processing circuit may be further configured for creating a wanted coverage, different antenna beams from omni, semi omni, sector and dual beams with different spatial directions, dependent on environment and deployment of the BTS.

An advantage with providing the configurable BTS, is that there is no need for mechanical orientation of the beam in an azimuth and elevation when a new or different cover In a second possible implementation of the BTS according to the first aspect, or the first possible implementation thereof, the processing circuit may be further configured for creating a plurality of sectors with different spatial orientation, using a plurality of downlink precoders for different physical cells.

Thereby, the BTS may enable creation of up to four spatial separated cells with one single BTS.

In a third possible implementation of the BTS according to the first aspect, or any of the previously described possible implementations thereof, the processing circuit may be further configured for causing the transceiver to transmit control plane signals in omni directional or sector directions, and UE plane signals in UE dedicated beams.

An advantage thereby comprises that control signalling/reference signalling may be transmitted within the defined cell, while UE dedicated signalling may be made in UE directed beams, thereby reducing downlink interference.

Thereby the received signal quality is improved, not only for the dedicated UE, but also for other neighbour UEs.

In a fourth possible implementation of the BTS according to the first aspect, or any of the previously described possible implementations thereof, the processing circuit may be further configured for detecting an angle of arrival of the spatial directions with a signal to noise and interference ratio for uplink signals from the UE exceeding a threshold value. Also, the processing circuit may be further configured for determining an angle of departure for downlink UE-specific signalling, based on the detected angle of arrival, which angle of departure may be utilised for downlink UE-specific signalling.

Thereby, reciprocity in uplink and downlink within the system is exploited to determine appropriate Angle of Departure for the UE dedicated beam directed to the UE, based on the determined angle of arrival. Thereby UE dedicated beamforming may be created in a convenient and reliable manner.

In a fifth possible implementation of the BTS according to the first aspect, or any of the previously described possible implementations thereof, the processing circuit may be further configured for detecting the angle of arrival of the strongest spatial directions for uplink signals from the UE by receiving Precoding Matrix Indicator (PMI) feedback from the UE. Also, the processing circuit may be further configured for determining an angle of departure for downlink UE-specific signalling, based on the detected angle of arrival, which angle of departure may be utilised for downlink UE-specific signalling.

Thereby, based on the reception of feedback from the UE, the downlink beamforming targeting the UE may be further fine-tuned, thereby further improving the previously enumerated advantages of the provided beamforming BTS.

In a sixth possible implementation of the BTS according to the first aspect, or any of the previously described possible implementations thereof, the processing circuit may be further configured for selecting downlink precoders so that transmission layers are de-correlated in spatial directions or with orthogonal polarizations.

An advantage by using de-correlated, orthogonal transmission layers is that interference is reduced, leading to enabling usage of high-order modulation techniques, thereby increasing transmission rate and throughput. Also, the signalling becomes less sensitive to the near-far effect.

In a seventh possible implementation of the BTS according to the first aspect, or any of the previously described possible implementations thereof, the MIMO antenna array may comprise a quadrature array with vertical polarized omni directional antenna elements in single or several layers.

By using this antenna structure, the flexibility of the BTS is highly increased, as it thereby is enabled to transmit both omni directional signals and dedicated beams, depending on the particular requirements of each individual BTS. Thus the system capacity and resources could be directed towards directions and areas where the user requirements are the biggest.

In an eighth possible implementation of the BTS according to the first aspect, or any of the previously described possible implementations thereof, the MIMO antenna array may comprise a quadrature array with vertical and horizontal polarized omni directional antenna elements in single or several layers.

By using this antenna structure, the flexibility of the BTS is even further increased, enabling directional fine-tuning of the antenna beam.

In a ninth possible implementation of the BTS according to the first aspect, or any of the previously described possible implementations thereof, the antenna beam direction may be remotely configurable. It may be possible to have to spatial separated antennas, each with e.g. four vertical or e.g. eight with vertical and horizontal polarization omni element. E.g. one at the top and one at the bottom.

An advantage therewith is that there will be no need for mechanical orientation of the antenna beam in an azimuth and elevation of the BTS to cover a wanted area, which saves work and money.

In a tenth possible implementation of the BTS according to the first aspect, or any of the previously described possible implementations thereof, the antenna beam direction may be time dependently configurable.

Thereby, the downlink cell pattern of the BTS may be configured to follow time dependent traffic over the day in the surrounding environment, leading to a better usage of hardware resources and better service for the users of the system.

In an eleventh possible implementation of the BTS according to the first aspect, or any of the previously described possible implementations thereof, all antenna elements of the MIMO antenna array may be participating in creating the antenna beam.

An advantage is that the beamforming of the BTS is further improved, thereby also enlarging the above mentioned plural advantages of beamforming in the disclosed manner.

According to a second aspect, the object is achieved by a method in a BTS configured for wireless communication with a UE in a wireless communication system. The BTS comprises a MIMO antenna array configured for beamforming and MIMO transmission. The method comprises downlink precoding by modifying phase excitation of the MIMO antenna array and causing the transceivers to create an antenna beam by providing the transmitted radio frequency carrier to have different phase for each antenna element of the MIMO antenna array. Further, the method also comprises transmitting a signal in the antenna beam via the MIMO antenna array, to be received by the UE.

Thereby, a flexible site deployment for different environments is enabled with one BTS type. Another advantage is that the BTS supports many types of possible site deployment and environments with the configurable downlink cell pattern to cover a wanted area and minimize the downlink interference with neighbouring cells. Thereby, the BTS may be mounted on a pole or wall and the downlink cell pattern may be selected to fit the mounting deployment and the environment the BTS is desired to cover.

By providing directional beamforming transmission, the link budget is improved which increases the signal to noise ratio as perceived by the UE, but also expand the range of the transmitted downlink signal, both open-space and for indoor penetration.

Furthermore, the beamforming of the BTS overcomes external and internal interference, e.g., Co-Channel Interference (CCI) by exploiting the spatial properties of the antenna array. Since the interference comes from a certain direction, the beamforming BTS may apply an interference avoiding beam forming technique by receiving less energy from the interferer.

A further advantage comprises increased network efficiency. By significantly reducing the interference, the BTS beamforming can allow much denser deployments than e.g. single antenna systems. Thanks to higher link budget, the likelihood of running high-order modulations (64 QAM, 16

QAM) is much higher even at the edges of the cell. Overall system capacity is thereby greatly improved.

In a first possible implementation of the method according to the second aspect, the method may comprise detecting an angle of arrival of the strongest spatial directions for uplink signals from the UE. Also, an angle of departure for downlink UE-specific signalling may be determined, based on the detected angle of arrival. Further, the signal may be transmitted in the antenna beam in the determined angle of departure for downlink UE-specific signalling.

Thereby, reciprocity in uplink and downlink within the system is exploited to determine appropriate Angle of Departure for the UE dedicated beam directed to the UE, based on the determined angle of arrival. Thereby UE dedicated beamforming may be created in a convenient and reliable manner.

In a second possible implementation of the method according to the second aspect, or the first possible implementation thereof, the method also may comprise creating a wanted coverage based on different antenna beams from omni, semi omni, sector and dual beams with different spatial directions, dependent on environment and deployment of the BTS.

An advantage with providing the configurable BTS, is that there is no need for mechanical orientation of the beam in an azimuth and elevation when a new or different cover area is desired.

In a third possible implementation of the method according to the second aspect, or any of the previously described possible implementations thereof, the method also may comprise creating a plurality of sectors with different spatial orientation, using a plurality of downlink precoders for different physical cells.

Thereby, the BTS may enable creation of up to four spatial separated cells with one single BTS.

In a fourth possible implementation of the method according to the second aspect, or any of the previously described possible implementations thereof, the method also may comprise transmitting control plane signals in omni directional or sector directions, and UE plane signals in UE dedicated beams.

An advantage thereby comprises that control signalling/reference signalling may be transmitted within the defined cell, while UE dedicated signalling may be made in UE directed beams, thereby reducing downlink interference. Thereby the received signal quality is improved, not only for the dedicated UE, but also for other neighbour UEs.

In a fifth possible implementation of the method according to the second aspect, or any of the previously described possible implementations thereof, the method may further comprise detecting an angle of arrival of the spatial directions, based on a signal to noise and interference ratio for uplink signals from the UE exceeding a threshold value, and utilise the detected angle of arrival for downlink UE-specific signalling by determining an angle of departure based on the detected angle of arrival.

Thereby, reciprocity in uplink and downlink within the system is exploited to determine appropriate Angle of Departure for the UE dedicated beam directed to the UE, based on the determined angle of arrival. Thereby UE dedicated beamforming may be created in a convenient and reliable manner.

In a sixth possible implementation of the method according to the second aspect, or any of the previously described possible implementations thereof, the method may further comprise detecting the angle of arrival of the strongest spatial directions for uplink signals from the UE by receiving Precoding Matrix Indicator (PMI) feedback from the UE and utilising the detected angle of arrival for downlink UE-specific signalling by determining an angle of departure based on the detected angle of arrival.

Thereby, based on the reception of feedback from the UE, the downlink beamforming targeting the UE may be further fine-tuned, thereby further improving the previously enumerated advantages of the provided beamforming BTS.

In a seventh possible implementation of the method according to the second aspect, or any of the previously described possible implementations thereof, the method may further comprise selecting downlink precoders so that transmission layers are de-correlated in spatial directions or with orthogonal polarizations.

An advantage by using de-correlated, orthogonal transmission layers is that interference is reduced, leading to enabling usage of high-order modulation techniques, thereby increasing transmission rate and throughput. Also, the signalling becomes less sensitive to the near-far effect.

In an eighth possible implementation of the method according to the second aspect, or any of the previously described possible implementations thereof, the MIMO antenna array may comprise a quadrature array with vertical polarized omni directional antenna elements in single or several layers.

By using this antenna structure, the flexibility of the BTS is highly increased, as it thereby is enabled to transmit both omni directional signals and dedicated beams, depending on the particular requirements of each individual BTS. Thus the system capacity and resources may be directed towards directions and areas where the user requirements are the biggest.

In a ninth possible implementation of the method according to the second aspect, or any of the previously described possible implementations thereof, the MIMO antenna array may comprise a quadrature array with vertical and horizontal polarized monopole omni directional antenna elements in single or several layers.

By using this antenna structure, the flexibility of the BTS is even further increased, enabling directional fine-tuning of the antenna beam.

In a tenth possible implementation of the method according to the second aspect, or any of the previously described possible implementations thereof, the method may further comprise configuring the antenna beam direction remotely.

An advantage therewith is that there will be no need for mechanical orientation of the antenna beam in an azimuth and elevation of the BTS to cover a wanted area, which saves work and money.

In an eleventh possible implementation of the method according to the second aspect, or any of the previously described possible implementations thereof, the method may further comprise configuring the antenna beam direction time dependently.

Thereby, the downlink cell pattern of the BTS may be configured to follow time dependent traffic over the day in the surrounding environment, leading to a better usage of hardware resources and better service for the users of the system.

In a twelfth possible implementation of the method according to the second aspect, or any of the previously described possible implementations thereof, all antenna elements of the MIMO antenna array may be participating in creating the antenna beam.

An advantage is that the beamforming of the BTS is further improved, thereby also enlarging the above mentioned plural advantages of beamforming in the disclosed manner.

According to a further aspect, the object is achieved by a computer program with a program code for performing a method according to the second aspect, or any of the previously described possible implementations thereof, when the computer program runs on a computer.

Thereby, a flexible site deployment for different environments is enabled with one BTS type. Another advantage is that the BTS supports many types of possible site deployment and environments with the configurable downlink cell pattern to cover a wanted area and minimize the downlink interference with neighbouring cells. Thereby, the BTS may be mounted on a pole or wall and the downlink cell pattern may be selected to fit the mounting deployment and the environment the BTS is desired to cover.

Thereby an improved performance within the wireless communication network is provided.

Other objects, advantages and novel features of the various implementation forms will become apparent from the subsequent detailed description.

BRIEF DESCRIPTION OF THE DRAWINGS

Various embodiments are described in more detail with reference to the attached drawings, illustrating examples of embodiments in which.

DETAILED DESCRIPTION OF ILLUSTRATIVE EMBODIMENTS

Embodiments of the invention described herein are defined as a BTS and a method in a BTS, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
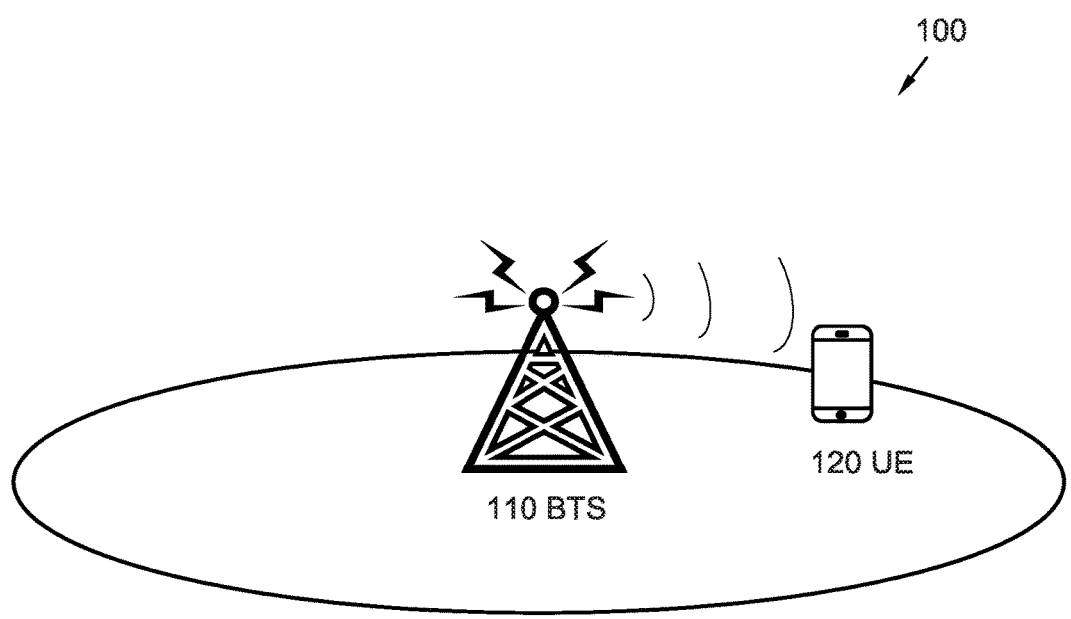
FIG. 1 is a block diagram illustrating a wireless communication network according to some embodiments.

FIG. 1 is a schematic illustration over a wireless communication network 100 comprising a Base Transceiver Station (BTS) 110 and a User Equipment (UE) 120, which may communicate wirelessly with each other.

The wireless communication network 100 may at least partly be based on radio access technologies such as, e.g., 3GPP LTE, LTE-Advanced, Evolved Universal Terrestrial Radio Access Network (E-UTRAN), Universal Mobile Telecommunications System (UMTS), Global System for Mobile Communications (originally: Groupe Spécial Mobile) (GSM)/Enhanced Data rate for GSM Evolution (GSM/EDGE), Wideband Code Division Multiple Access (WCDMA), Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1xRTT and High Rate Packet Data (HRPD), just to mention some few options. The expressions "wireless communication network" and "wireless communication system" may within the technological context of this disclosure sometimes be utilized interchangeably.

The wireless communication network 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a Guard Period (GP) situated in the time domain between the uplink and downlink signalling. FDD means that the transmitter and receiver operate at different carrier frequencies.

Further, the wireless communication network 100 may be configured for Multiple Input Multiple Output (MIMO), according to some embodiments.

The wireless communication network 100 covers a geographical area which is divided into cell areas, with each cell area being served by the BTS 110, which in some networks may be referred to as radio network node, or base station, e.g., a Radio Base Station (RBS), "eNB", "eNodeB", "NodeB" or "B node", depending on the technology and/or terminology used.

Sometimes, the expression "cell" may be used for denoting the BTS 110 itself. However, the expression cell may also in normal terminology be used for the geographical area where radio coverage is provided by the BTS 110 at a base station site. One BTS 110, situated on the base station site, may serve one or several cells. The BTS 110 may communicate over the air interface operating on radio frequencies with any UE 120 within range of the respective BTS 110.

A User Equipment (UE) 120, also known as a mobile station, wireless terminal and/or mobile terminal is enabled to communicate wirelessly in the wireless communication network 100, which sometimes also may be referred to as a cellular radio system. The communication may be made, e.g., between UEs 120, between a UE 120 and a wire connected telephone and/or between a UE 120 and a server via a Radio Access Network (RAN) and possibly one or more core networks. Such wireless communication may comprise various communication services such as voice, messaging, packet data, video, broadcast, etc.

The UE 120 may further be referred to as mobile telephone, cellular telephone, computer tablet or laptop with wireless capability, etc. The UE 120 in the present context may be, for example, portable, pocket-storable, hand-held, computer-comprised, or vehicle-mounted mobile devices, enabled to communicate voice and/or data, via the radio access network, with another entity, such as another UE or a server.

For different site deployment, the BTS 110 may flexibly modify the downlink antenna pattern for the control plane signals and channels that define the cell with down link precoders in a Multiple Input Multiple Output (MIMO) transmitter. The downlink pattern may be omni-directional, semi omni-directional or sector beams to optimise coverage, traffic steering and minimise downlink interference with other, neighboring cells.

In the present context, the expressions downlink, downstream link or forward link may be used for the transmission path from the BTS 110 to the UE 120. The expression uplink, upstream link or reverse link may be used for the transmission path in the opposite direction, i.e., from the UE 120 to the BTS 110.

For UE plane channels, i.e. UE dedicated channels, the herein disclosed embodiments may use individual spatial de-correlated downlink MIMO beams with precoders based on pre-defined precoders like in 3GPP LTE release 10 or by propriety solutions that uses uplink spatial information and uplink channel state information to create precoders for transmission layers to one or several UEs 120, in different embodiments.

In the uplink, some embodiments of the BTS 110 may use the antenna solution and the diversity receiver as a normal N-way receiver with algorithms such as e.g. Maximal-Ratio Combining (MRC), Interference Rejection Combining (IRC) and/or Minimum Mean-Square Error (MMSE). For estimating the spatial channel of the UE 120, the receiver/transceiver comprised in the BTS 110 may detect the strongest direction, one or several, from the connected UE 120 in some embodiments. This spatial information may be used for downlink precoders to the specific UE 120, due to reciprocity.

The purpose of the illustration in FIG. 1 is to provide a simplified, general overview of the wireless communication network 100 and the involved methods and nodes, such as the BTS 110 and UE 120 herein described, and the functionalities involved. The methods, BTS 110 and UE 120 will subsequently, as a non-limiting example, be described in a 3GPP LTE/LTE-Advanced environment, but the embodiments of the disclosed methods, BTS 110 and UE 120 may operate in a wireless communication network 100 based on another access technology such as, e.g., any of the above enumerated. Thus, although the embodiments herein are described based on, and using the lingo of, 3GPP LTE systems, it is by no means limited to 3GPP LTE.

It is to be noted that the illustrated network setting of one BTS 110 and one UE 120 in FIG. 1 is to be regarded as a non-limiting example of an embodiment only. The wireless communication network 100 may comprise any other number and/or combination of BTSs 110 and/or UEs 120. A plurality of UEs 120 and another configuration of BTSs 110 may thus be involved in some embodiments. Thus whenever "one" or "a/an" UE 120 and/or BTS 110 is referred to in the present context, a plurality of UEs 120 and/or BTSs 110 may be involved, according to some embodiments.

The BTS 110 may according to some embodiments be configured for downlink transmission and may be referred to, respectively, as e.g., a base station, NodeB, evolved Node Bs (eNB, or eNode B), base transceiver station, Access Point Base Station, base station router, Radio Base Station (RBS), micro base station, pico base station, femto base station, Home eNodeB, sensor, beacon device, relay node, repeater or any other network node configured for communication with the UE 120 over a wireless interface, depending, e.g., of the radio access technology and/or terminology used.

The UE 120 may correspondingly be represented by, e.g. a wireless communication terminal, a mobile cellular phone, a Personal Digital Assistant (PDA), a wireless platform, a mobile station, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the BTS 110, according to different embodiments and different vocabulary.

Embodiments of the BTS 110 may comprise an antenna solution and a MIMO transceiver architecture that enables arranging the beams of the MIMO antenna in flexible ways for both defining cell coverage and for UE dedicated MIMO antenna beams. Thereby, a more flexible site deployment is achieved.

The BTS 110 supports many types of possible site deployment and environments with the configurable downlink cell pattern to cover the wanted area and minimize, or at least reduce, downlink interference with neighbouring cells. E.g. the BTS 110 may be mounted on a pole or on a wall and the downlink cell pattern may be selected to fit the mounting deployment and the environment the BTS 110 is intended to cover. Thus a flexible site deployment for different environment with only one BTS type: the BTS 110.

Yet an advantage of the disclosed BTS 110 is that there is no need for manual/mechanical orientation of the beam in an azimuth and elevation of the BTS 110 to cover a wanted area.

Further, the BTS 110 may provide up to four spatial separated cells with one single unit.

Also, the BTS 110 solves multi user MIMO scheduling with a very compact hardware unit that comprises an integrated MIMO antenna array solution. The spatial de-correlated beams may be configured in the horizontal plane.

Yet an advantage provided by the BTS 110 is that time dependent traffic steering is enabled. Thus DL cell pattern may be configured over time, to adapt the cell coverage to the network time dependent traffic over the day in the surrounding environment. E.g. the BTS 110 may focus the DL cell pattern on bus stops and the road during morning and afternoon, while during lunch time the node may cover the lunch restaurants and in between office buildings.

In other embodiments, the DL cell pattern may be directed towards an office area during office hours and towards a neighbouring block of flats during evenings, nights and weekends. In further embodiments, the time dependency of the BTS cell pattern configuration may be based on the time of the year, tilting the cell pattern towards e.g. the beach during the summer time and towards the nearby situated cafes and restaurants during the rest of the year.

The time dependency of the DL cell pattern according to some embodiments may be based on statistical analysis of traffic pattern within the cell and/or area surrounding the BTS 110. In other embodiments, it may be based on operator experienced estimation of radio traffic demands of users within the area. In some embodiments, a measurement or estimation of the user activities within the area may be made by the BTS and the cell may be directed towards the directions and areas comprising most users/UEs.

Figure 2:
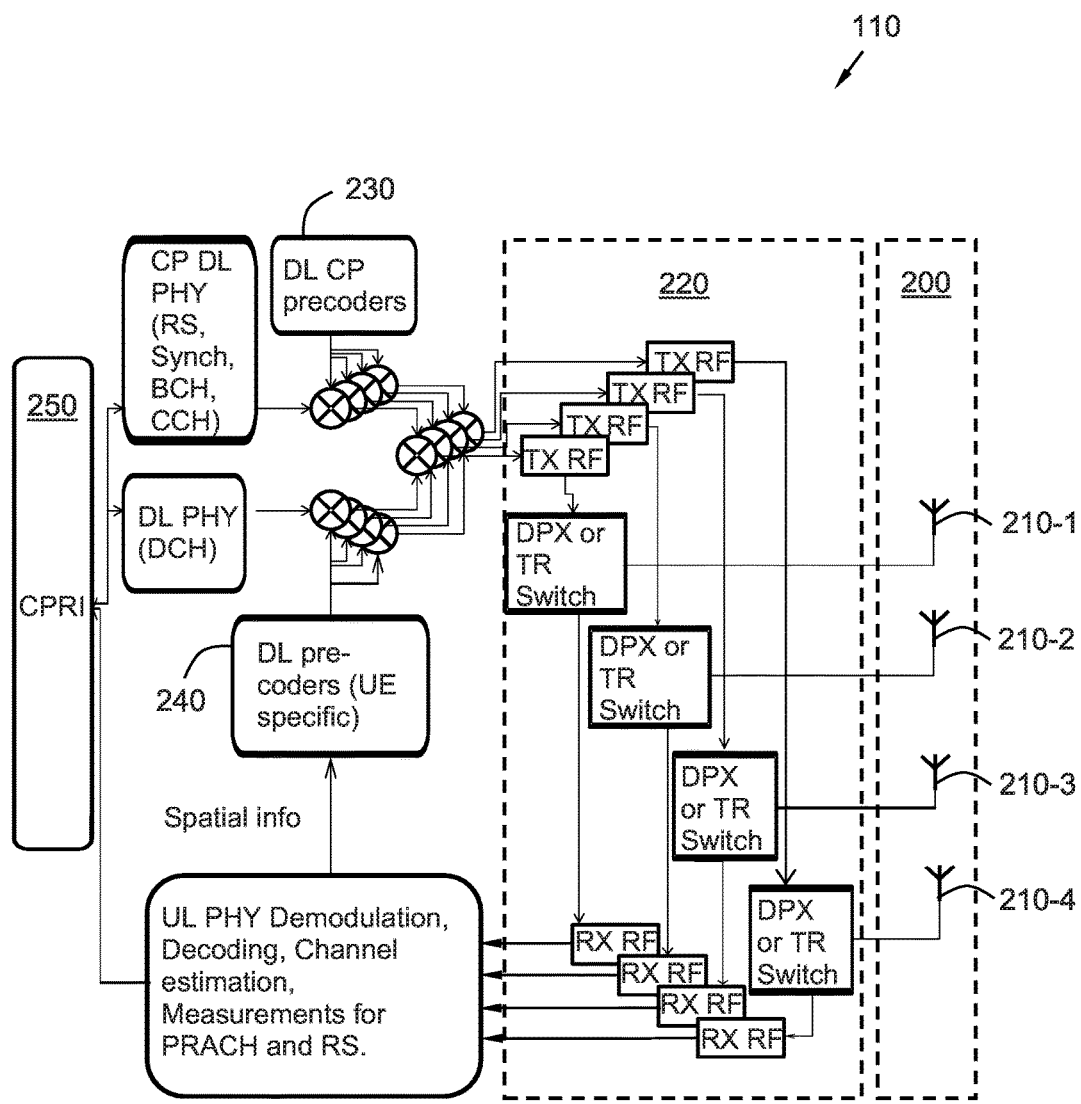
FIG. 2 is a block diagram illustrating a BTS according to some embodiments.

FIG. 2 illustrates a BTS 110, according to an embodiment. The BTS 110 comprises a MIMO transceiver 220 and a MIMO antenna array 200. The concept described in FIG. 2 shows a 4×4 MIMO solution. Higher order of MIMO solutions may be used in some embodiments, such as e.g. 8×8. The MIMO antenna array 200 comprises antenna elements 210, The BTS 110 may comprise a baseband (BB) Downlink (DL) Physical Layer (PHY) to support 4×4 (or higher) antenna configuration and DL precoders 230, 240 for both UE plane signalling and control plane signalling. The UE plane signalling may comprise UE dedicated channels, i.e. UE specific beams, while the control plane signalling may comprise, Reference Signals (RS) also called pilots, synch channels (SCH), Broadcast channels (BCH) and common control channels (CCH) to define cell coverage.

Also, the BTS 110 may comprise a BB UL PHY that may support detection of strongest spatial directions for both signal strength and interference for individual UE 120 that can be used for DL precoders 230, 240 or traffic statistics.

The comprised MIMO transceiver 220 supports calibration of the antenna array 200, thereby enabling coherent beam forming.

A Common Public Radio Interface (CPRI) 250 may create an interface between the radio transmitting part and the network connected part of the BTS 110 in some embodiments. However, the herein described method is not limited to, or dependent upon any particular protocol interface.

Figure 3:
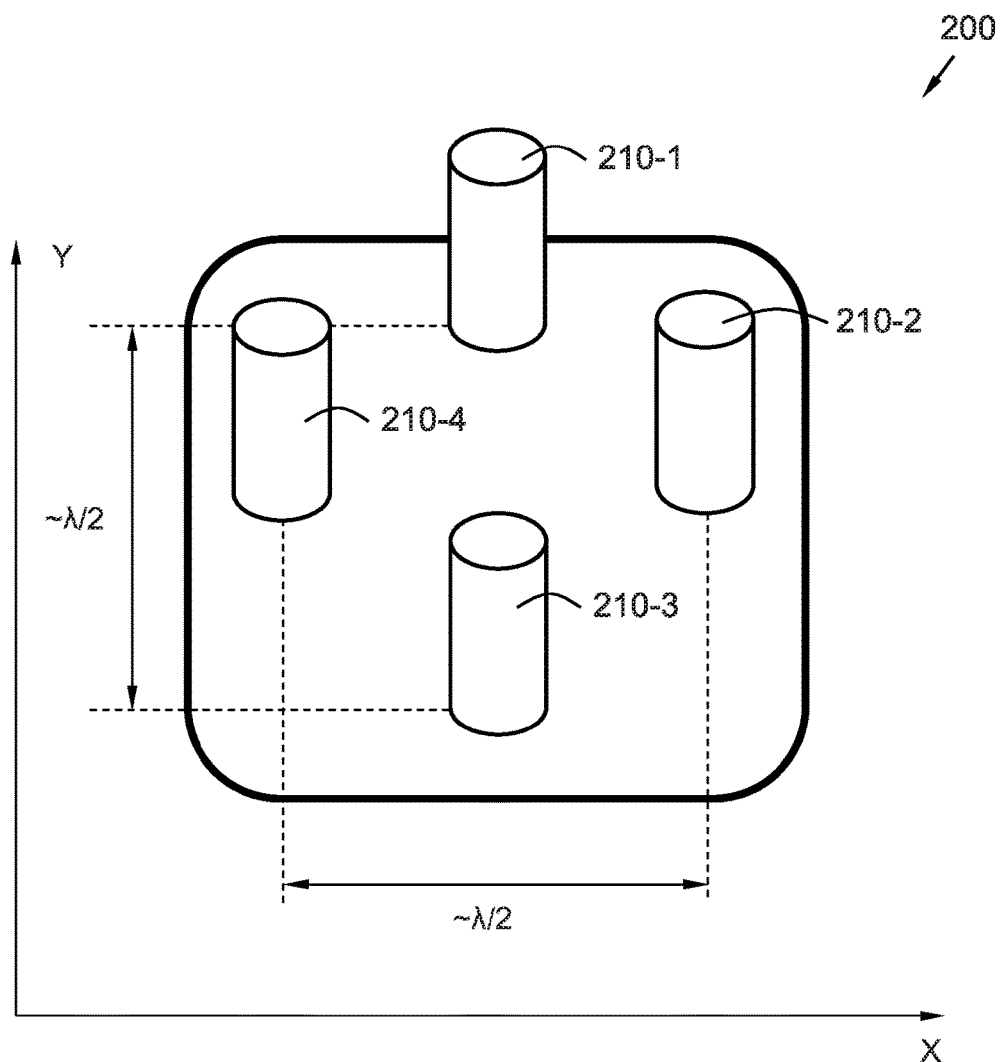
FIG. 3 is a block diagram illustrating an antenna array according to an embodiment.

The antenna array 200 may comprise four omni directional antenna elements 210-1, 210-2, 210-3, 210-4, like e.g. monopoles or dipoles, placed on a ground plane that can have different shape, e.g. circular, rectangular or quadratic as illustrated in FIG. 3. This is however merely one example of a possible antenna implementation out of various others. The omni directional elements 210 may comprise vertical polarized radiators. Other options with increased omni directional elements 210 are also possible, using two polarisations, like vertical and horizontal, in different embodiments. An advantage with having two polarisations, vertical and horizontal, is that spatial multiplexing is enabled.

Spatial multiplexing is possible also with just one polarization. However, when all the vertical elements are combined to one logical port and all horizontal elements are combined to another port, then both polarizations may be required to achieve spatial multiplexing, or other diversity signal combination schedules, according to some embodiments.

In the illustrated example, the distance between the antenna elements 210 is approximately $\lambda/2$, where $\lambda$ is the wave length of the radio transmission. This is however only a non-limiting example. The concept may be used for other spatial separations also. The distance between the antenna elements 210 may be for example 0.4-0.6$\lambda$; 0.3-0.7$\lambda$, or there about in some different embodiments. However, when the spatial separation distance between antenna elements 210 considerably exceeds $\lambda/2$, the direction of the created beam may be affected. Thereby, the possibilities of generating ideal omni- or sector beams will be limited. For instance, the omni beam may have more ripple, and the sector beam may have higher sidelobes.

When installing the BTS 110 in a particular site; e.g., on a pole, wall or roof top, it is possible to direct the BTS cell coverage in an arbitrary direction dependent on the site deployment and the environment where the BTS 110 is located, without need of any mechanical re-direction of the antenna in order to re-direct the antenna beam, in both azimuth and elevation. This may be enabled by feeding the respective antenna elements 210 with different phases, as will be further discussed in conjunction with FIG. 4. Thereby, mechanical/manual re-orientation of the BTS antenna 200 for different cell coverage is avoided.

According to some embodiments illustrated herein, it possible to direct sector coverage in arbitrary directions, or optionally having omni-directional, dual beam, half sphere or sector coverage. Some embodiments may also support sectorization.

Figure 4:
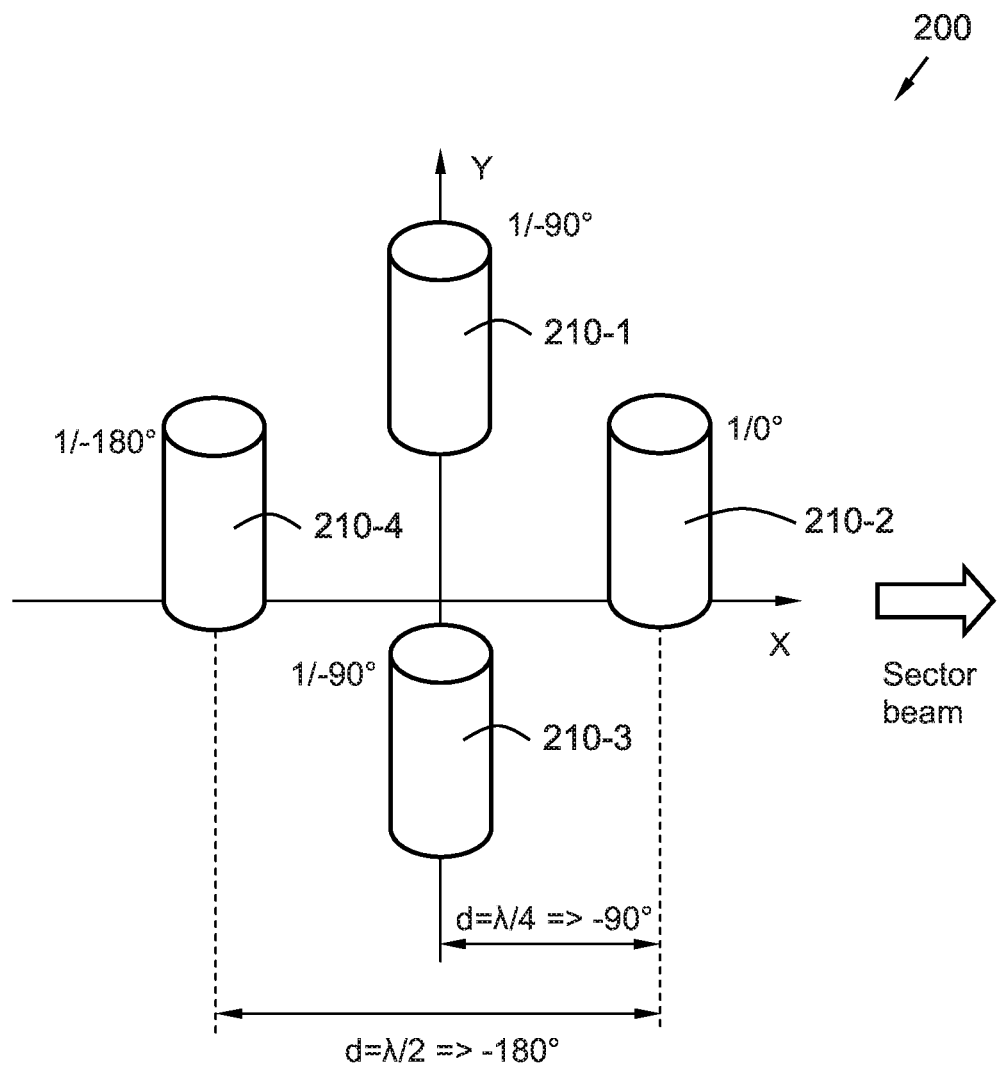
FIG. 4 is a block diagram illustrating an antenna array according to an embodiment.

The DL precoders 230, 240 may modify the phase excitation of the antenna array 200. With different phase for each antenna element 210, different antenna beams will be created. FIG. 4 illustrates an example wherein the DL precoder 230, 240 creating a sector beam in the x-direction for the antenna array 200 by modifying phase excitation of the signals fed to each individual antenna element 210-1, 210-2, 210-3, 210-4. In the illustrated example, the first individual antenna element 210-1 is fed with a modified phase excitation of 1/−90°, the second individual antenna element 210-2 is fed with a modified phase excitation of 1/0°, the third individual antenna element 210-3 is fed with a modified phase excitation of 1/−90°, and the fourth individual antenna element 210-4 is fed with a modified phase excitation of 1/−180°.

As commented in conjunction with, the distance between the antenna elements 210 on an axis, X or Y, may be approximately $\lambda/2$, corresponding to approximately −180°, where $\lambda$ is the wave length of the radio transmission. This is however only a non-limiting example. The concept may be used for other spatial separations also. The distance between the antenna elements 210 may be for example 0.4-0.6$\lambda$; 0.3-0.7$\lambda$, or there about in some different embodiments. The distance between the antenna elements 210-1, 210-3 situated on the Y axis in between the antenna elements 210-2, 210-4 situated on the X axis may be approximately $\lambda/4$, corresponding to approximately −90°, in some embodiments. Thereby all four antenna elements 210-1, 210-2, 210-3, 210-4 may contribute to the created sector beam in substantially one single direction, i.e. the antenna beam direction.

Figure 5:
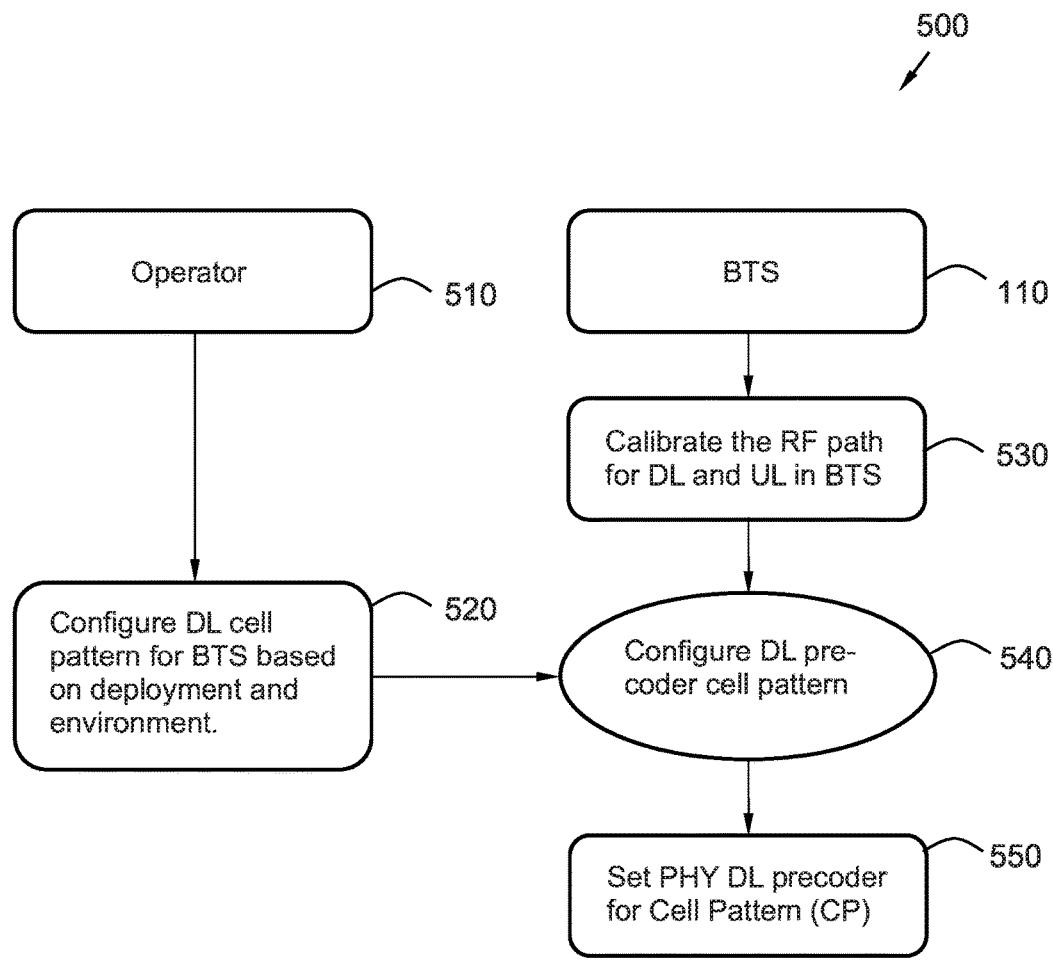
FIG. 5 is a flow chart illustrating a method in the BTS according to an embodiment.
Figure 6A:
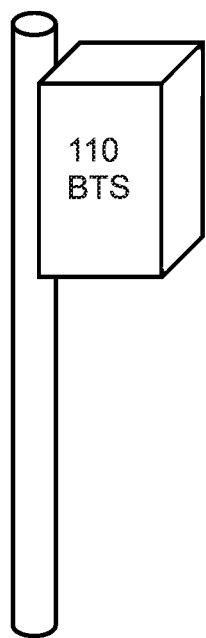
FIG. 6A illustrates an example of BTS deployment.
Figure 6B:
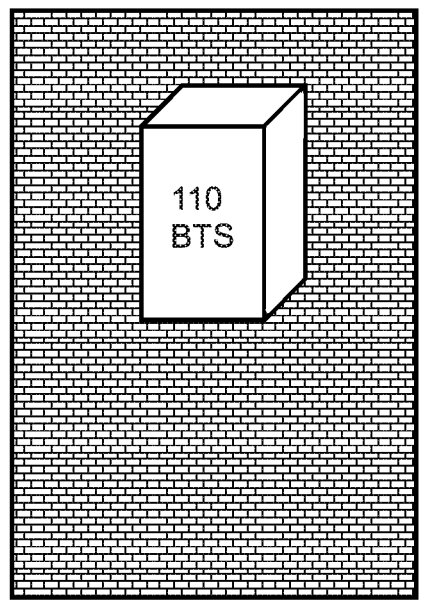
FIG. 6B illustrates yet an example of BTS deployment.

The DL precoders 230, 240 may be predefined based on deployment and environment, see FIG. 5 and FIG. 6A and FIG. 6B. FIG. 5 illustrates an example of setting DL precoder 230, 240 for cell pattern with aspect to deployment and environment according to a method 500.

An operator 510 may configure the DL cell pattern for the BTS 110, based on deployment and environment in an action 520. At the BTS 110, the radio frequency path may be calibrated for DL and UL in the BTS 110, in an action 530. Based thereupon, DL precoder cell pattern may be configured in action 540. Finally, the physical DL precoder for cell-pattern may be set in action 550.

FIG. 6A illustrates a pole mounted BTS 110 and FIG. 6B illustrates a wall mounted BTS 110.

With the LTE frame structure different DL precoders 230, 240 may be used for Resource Elements (RE) which makes it possible to create DL beams for an individual RE.

This may be used in some embodiments of the BTS 110 to create several sectors with different spatial orientation that uses several DL precoders 230, 240 for different Physical Cell ID (PCI).

Figure 7:
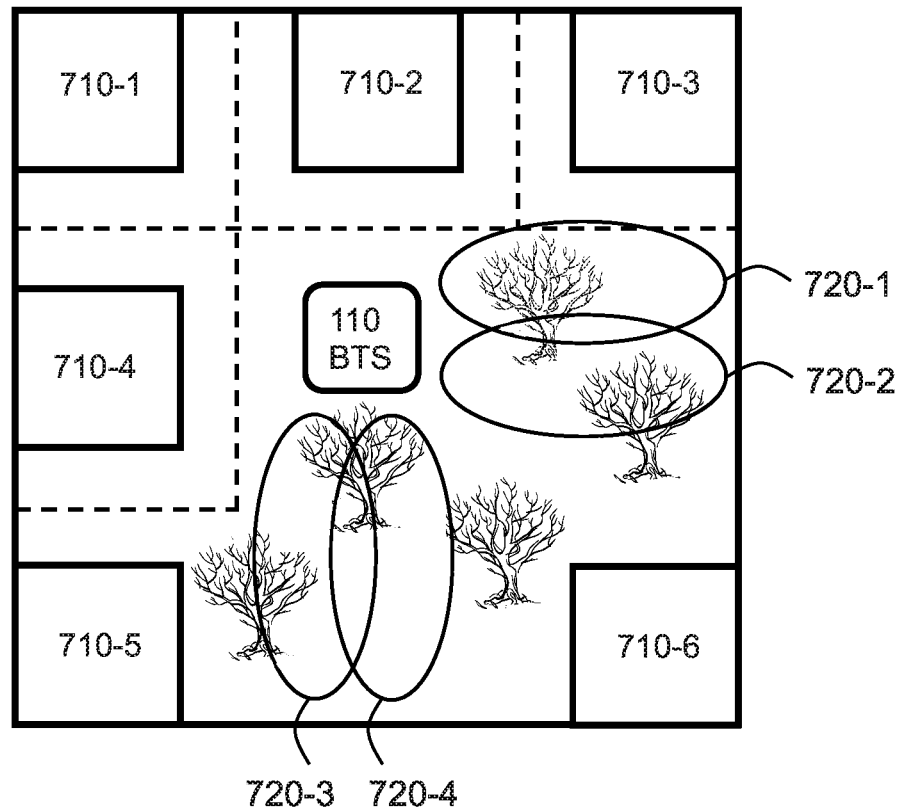
FIG. 7 illustrates a possible dual sector coverage configuration of the BTS according to an embodiment.
Figure 8:
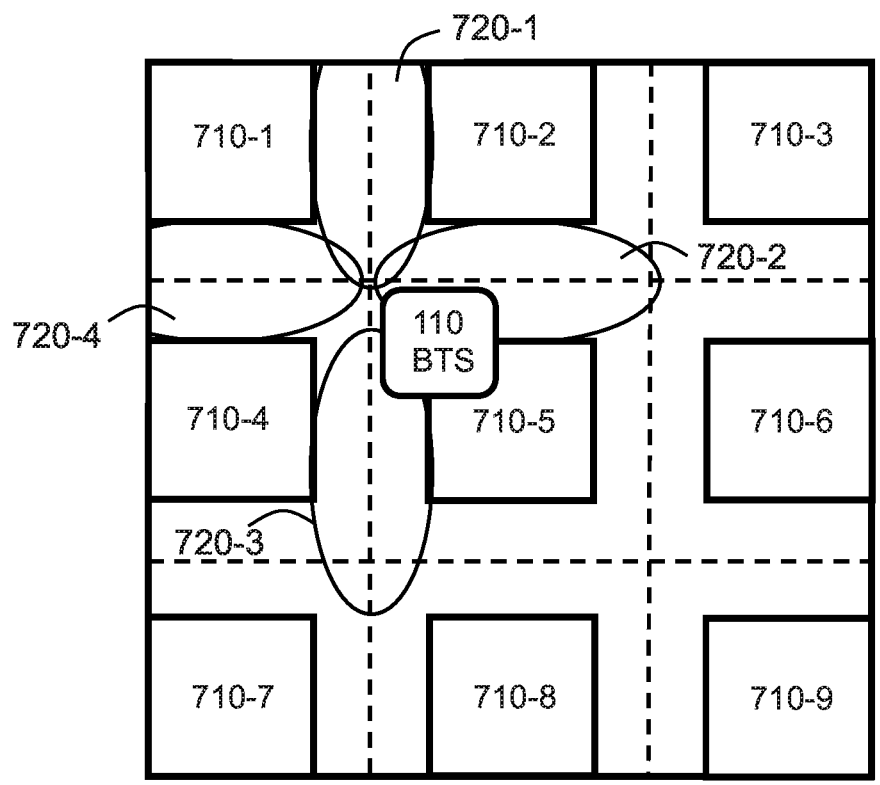
FIG. 8 illustrates yet a possible dual sector coverage configuration of the BTS according to an embodiment.

FIG. 7 and FIG. 8 illustrates some arbitrary examples of sectorization, according to some different embodiments. FIG. 7 illustrates a possible dual sector coverage configuration, while FIG. 8 illustrates a possible street coverage configuration with dual beam configuration for a street canyon scenario. In FIG. 7 and FIG. 8 the previously presented BTS 110 from FIG. 1 has defined a cell coverage by using a DL precoder 230, 240 for the reference and synchronization signals and the common control and broadcast channels in an urban landscape comprising a number of buildings 710-1, 710-2, 710-3, 710-4, 710-5, 710-6, 710-7, 710-8, 710-9. Thus four distinct cells 720-1, 720-2, 720-3, 720-4 have been created, directed in different directions, e.g. based on service requirements, as illustrated in FIGS. 7 and 8, respectively.

Figure 9:
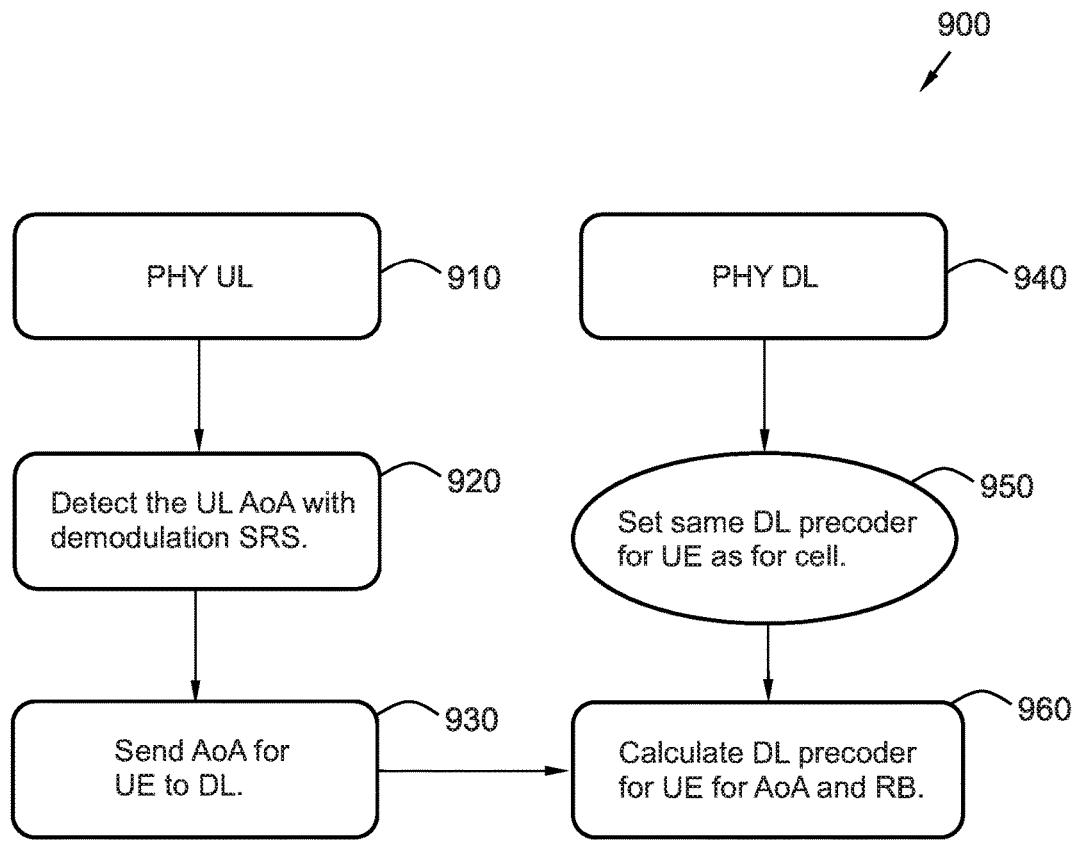
FIG. 9 is a flow chart illustrating a method in the BTS according to an embodiment.

For the UE dedicated channels, the DL beam selection may be generated by using uplink information of received signal for the specific UE 120, e.g., determine the Angle of Arrival (AoA) by combining the signal in the antenna array, see FIG. 9, and/or by receiving feedback from the UE 120, for example in form of a Precoding Matrix Indicator (PMI) in LTE. However, other type of UE uplink reference signals may be used in some embodiments, e.g. in WiFi.

An embodiment of the method 900 for selecting DL precoders will now be explained. In physical UL hardware 910 comprised in the BTS 110, detection of uplink angle of arrival may be determined in an action 920, by demodulating Sounding Reference Signal (SRS). The detected angle of arrival for the UE 120 may then be sent to the physical DL hardware 940 of the BTS 110, e.g. by internal wired or wireless communication. In the physical DL hardware 940 the same DL precoder may be set up for the UE 120, as for the cell in an action 950. When the angle of arrival for the UE 120 is obtained from the physical UL hardware 910, a DL precoder for the UE 120 may be determined in an action 960, based on the obtained angle of arrival for the UE 120.

The AoA may sometimes also, or alternatively be referred to as Direction of Arrival (DoA), or just "direction", of the received uplink signal. AoA measurement is a method for determining the direction of propagation of a radio-frequency wave incident on the antenna array 200.

AoA may be determined by measuring the arrival time delay, or Time Difference of Arrival (TDOA) at individual antenna elements 210 of the antenna array 200; and based on these delays, the AoA may be calculated. Generally such TDOA measurement may comprise measuring the difference in received phase at each element in the multiple antenna array 200. This may be thought of as beamforming in reverse. In downlink beamforming, the signal from each antenna element 210 may be delayed by some weight to steer the gain of the antenna array 200 in relation to the particular UE 120. In AoA, the delay of arrival at each antenna element 210 may be measured directly and converted to an AoA measurement, in some embodiments.

Further, a filtering may be made for filtering out weak uplink signals. Thus received uplink signals having a signal strength below a threshold value may be filtered out. The AoA of the remaining, selected signals may then be determined and a receiver pre-filter, for isolating signals received from the determined AoA, may be determined. The other signals/AoAs may be discarded.

Due to reciprocity in uplink and downlink, the determined AoA may be utilised to determine appropriate Angle of Departure (AoD) for the UE dedicated beam directed to the UE 120, in some embodiments.

The BTS 110 may be used in different modes in some embodiments. One mode may be the above described cell-defining mode, where the desired cell-coverage is defined, i.e. omni, sector, dual-beam. In another mode, the BTS 110 may listen to the uplink Sounding Reference Signals (SRS) of the UE 120 and due to reciprocity, use matched filter (H') to achieve beamforming for the downlink transmission to the UE 120. In yet another mode, the reciprocity of the uplink SRSs of the UE 120 may be used for precoding signals to achieve spatial multiplexing.

Figure 10:
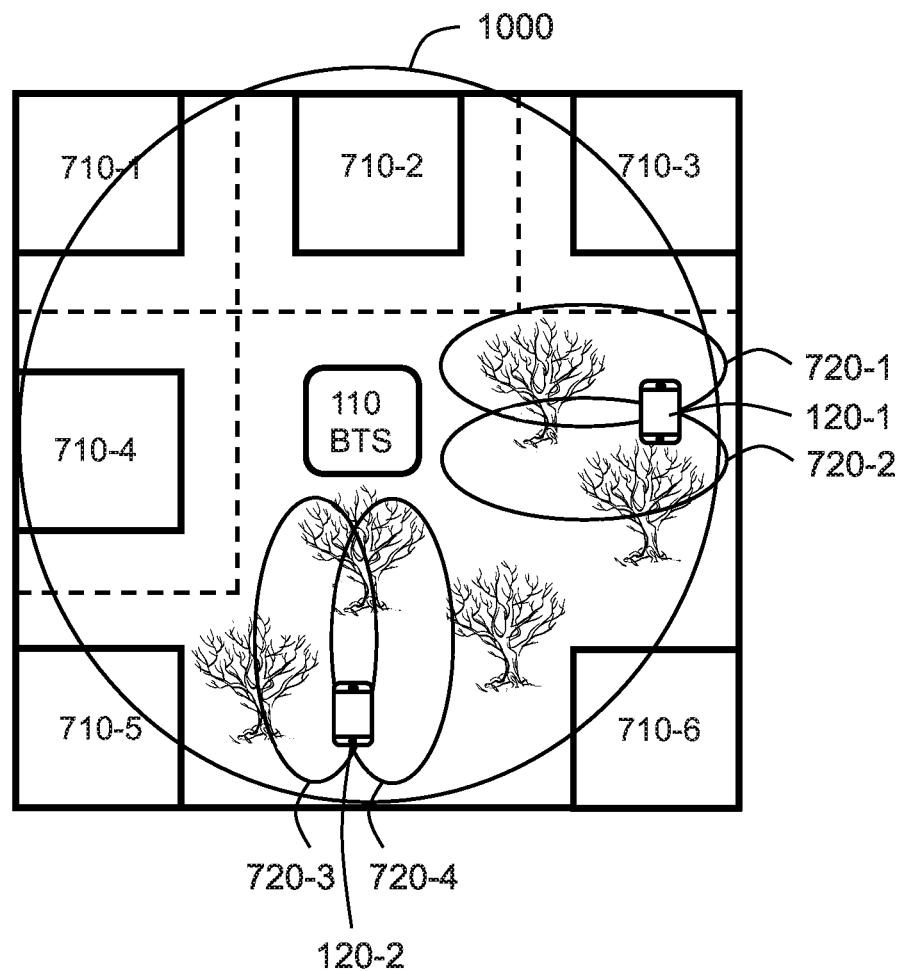
FIG. 10 illustrates a possible configuration of cell coverage and UE specific beams of the BTS according to an embodiment.

FIG. 10 illustrates an implementation of cell coverage and user specific beams with beam selection or spatial multiplexing, according to an embodiment. According to the illustrated example, cell beamforming 1000 of the BTS 110, together with UE specific beams 720 for two UEs 120-1, 120-2 with two spatial multiplexed transmission layers to each UE 120-1, 120-2 are shown in an urban landscape comprising a number of buildings 710-1, 710-2, 710-3, 710-4, 710-5, 710-6. The DL precoders 230, 240 may be selected so that the spatial transmission layers are as de-correlated as possible, i.e. orthogonal to each other. The multi-UE pairing may be made based on UL AoA detection, possibly together with UE feedback to create multi UE precoders 230, 240 in some embodiments.

Figure 11:
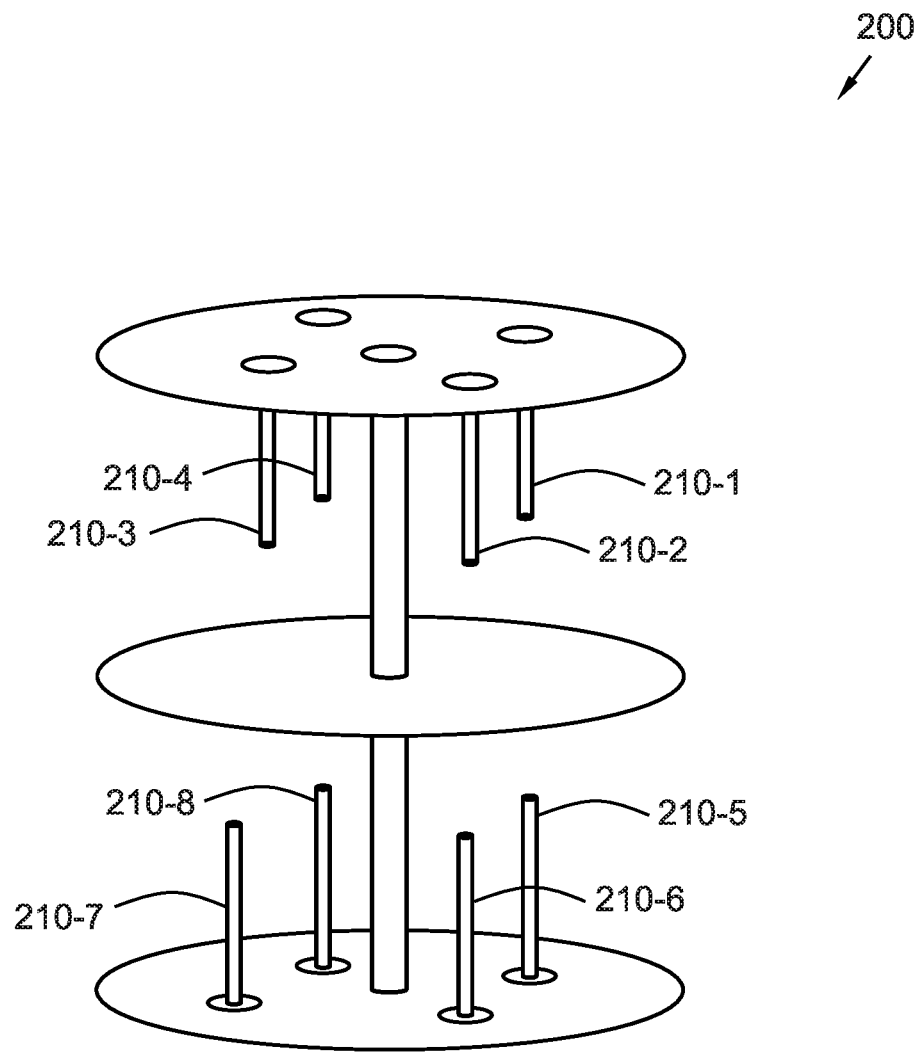
FIG. 11 depicts an antenna configuration according to an embodiment.

Different embodiments may be based on a broadband omni directional antenna, monopole, dipole or other omni directional antenna element, comprising one or two polarized orthogonal radiation patterns for each element. In FIG. 11 an example of a vertical polarized antenna array are shown. FIG. 11 illustrates an example of a dual layer quadrature array with vertical polarized monopole antenna elements.

In FIG. 11, the antenna structure 200 comprises 8 vertical polarized antennas 210 divided into two layers. Each layer has the antenna elements 210 in a quadrature configuration. In elevation (Phi plane) the antenna elements 210 may have similar radiation pattern due to the symmetry created by the ground plane reflector which enables down-tilting and/or up-tilting of the antenna elevation patterns. The antenna structure 200 may be stacked in height to create narrower antenna half power beam width in elevation. Some other possible embodiments of antenna elements 210 may comprise e.g. dual polarized dipoles with an 8×8 antenna configuration. The illustrated embodiment of the antenna array 200 is merely an arbitrary example. The antenna array 200 may be embodied in various ways, such as e.g. illustrated in FIG. 12.

Figure 12:
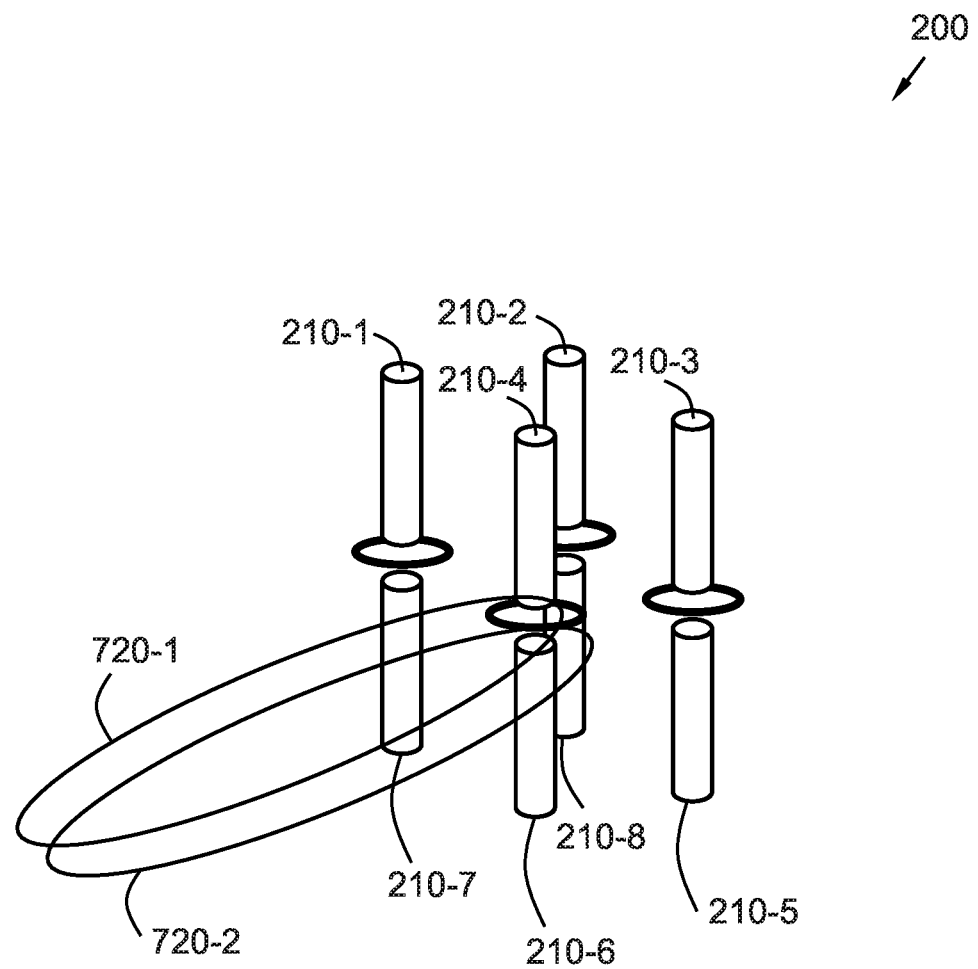
FIG. 12 depicts an antenna configuration according to an embodiment.

FIG. 12 illustrates an example of an antenna array 200 comprising dual polarized antenna elements 210, according to an embodiment. Thus vertical polarized radiators may optionally be combined with horizontal radiators in some embodiments.

According to some embodiments herein, the BTS 110 may be provided with a MIMO antenna array 200, configured to support many site deployment and radio environments by having a possibility to direct the beam in wanted directions in the horizontal plane without requirements to change the mechanical orientation of the BTS 110 and or the antenna array 200. Thus the tedious task of a technician having to physically climb up to the BTS 110 and change direction is omitted. The beam orientations may be controlled remotely, making it possible to change the beams to different directions depending on where the capacity is needed, e.g., depending on the time of the day, the time of the year etc., in some embodiments.

The BTS 110 comprising the MIMO antenna array configuration may in some embodiments support sectorization with up to four different spatial separated sectors 720.

Some embodiments of the BTS 110 comprising the MIMO antenna array configuration may make it possible to achieve up to total 8 transmission layers Single User MIMO (SU-MIMO) transmissions or Multi User MIMO (MU-MIMO) with dual polarized omni directional antenna elements 210, or up to total 4 transmission layers SU-MIMO or MU-MIMO with single polarized Omni directional antenna elements 210 within a compact BTS and MIMO antenna array configuration.

Further, the disclosed BTS 110 comprising the MIMO antenna array configuration according to some embodiments may make it possible to create arbitrary orthogonal beams on the BTS 110 that may be directed in any desired direction. This will make it very flexible to make a custom solution for any kind of beam coverage requested for the BTS 110 for different site deployment and radio environments.

According to some further embodiments, it may also be possible to implement Self-Optimising Network (SON) features as network optimising cell coverage and also time dependent spatial traffic steering of capacity in the wireless communication system 100.

Furthermore, the spatial multiplexing may also be improved by having individual beam pattern for different UEs 120. This means that more transmission layers may be transmitted to one (single user MIMO) or several scheduled UEs 120 (Multi user MIMO) according to some embodiments.

According to the conventional solutions to this date, a base station has either omni directional or sector coverage. If coverage needs to be changed, a technician is required to physically visit the BTS site and redirect the antennas in new directions. When it comes to network features such as optimising downlink coverage and time dependent spatial traffic steering of capacity, only conventional BTS with multi antennas or using switched antenna beam may support this.

For spatial multiplexing several antenna configurations may be used in different embodiments, in association with the BTS 110. An advantage according to some disclosed embodiments comprises the creation of spatial de-correlated beams over the entire azimuth plane, and also support sector beams for cell coverage with one compact BTS solution.

Some embodiments of the BTS 110 may comprise a BTS architecture as illustrated e.g. in FIG. 2 with a MIMO antenna array 200 as illustrated e.g. in FIGS. 2-4, and/or FIGS. 11-12. The BTS 110 may also comprise DL precoders 230, 240 for flexible cell coverage that may be used for ease of deployment and adaptation to environment for various types of antenna patterns. In some embodiments, spatial multiplexing, SU-MIMO and/or MU-MIMO, with spatial de-correlated UE-specific beam patterns for the entire azimuth plane is enabled.

Figure 13:
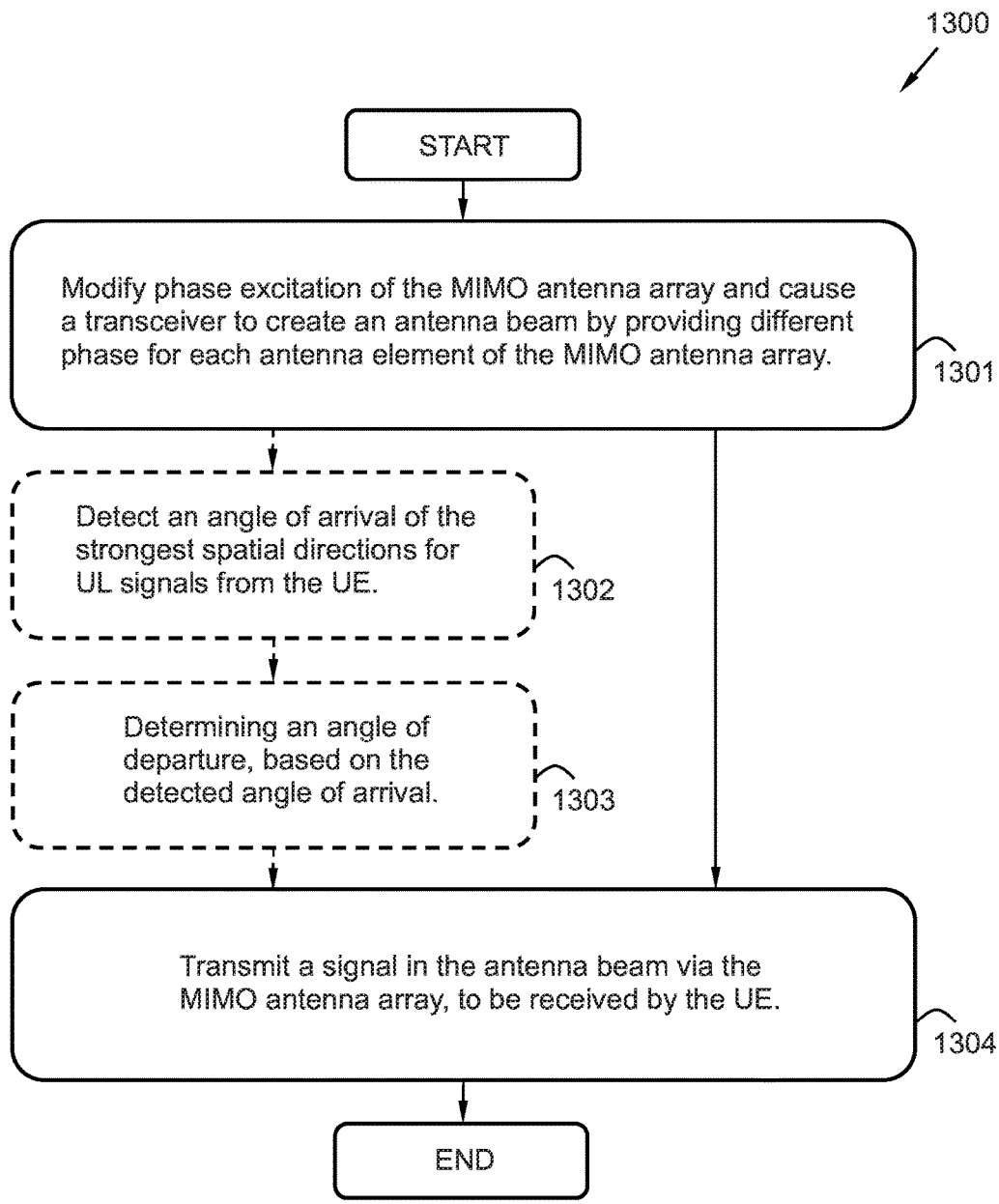
FIG. 13 is a flow chart illustrating a method in the BTS according to an embodiment.

FIG. 13 is a flow chart illustrating embodiments of a method 1300 in a Base Transceiver Station (BTS) 110, for wireless communication with a User Equipment (UE) 120 in a wireless communication system 100, in antenna streams. The BTS 110 comprises a Multiple Input Multiple Output (MIMO) antenna array 200 configured for beamforming and MIMO transmission. The MIMO antenna array 200 may comprise a quadrature array with vertical polarized omni directional antenna elements 210 in single, dual or several layers.

The multiple antenna array 200 comprises a multitude of antenna elements 210, such as e.g. 4, 6, 8 or more antenna elements 210. The multitude of antenna elements 210 may in some embodiments be mounted at a distance from each other, within the multiple antenna array 200, corresponding to approximately $\lambda/2$, such as e.g. $0.4$-$0.6 \cdot \lambda$; $0.3$-$0.7 \cdot \lambda$, or similar interval. Some, several or all of the antenna elements 210 may be able to transmit and/or receive the same signal to/from the UE 120 in an antenna beam. The antenna beam direction may be remotely configurable in some embodiments. Furthermore, the antenna beam direction may be time dependently configurable in some embodiments. In some embodiments, all antenna elements 210 of the MIMO antenna array 200 may be participating in creating the antenna beam.

The wireless communication network 100 may be based on 3rd Generation Partnership Project Long Term Evolution (3GPP LTE). Further, the wireless communication system 100 may be based on FDD or TDD. The BTS 110 may comprise an evolved NodeB (eNodeB) according to some embodiments.

To appropriately communicate in antenna streams with the UE 120, the method 1300 may comprise a number of actions 1301-1304. It is however to be noted that any, some or all of the described actions 1301-1304, may be performed in a somewhat different chronological order than the enumeration indicates, be performed simultaneously or even be performed in reversed order. Some of the described actions, such as 1302 and/or 1303 may be performed only within some embodiments of the method 1300. Further, it is to be noted that some actions may be performed in a plurality of alternative manners according to different embodiments. The method 1300 may comprise the following actions:

Action 1301

The MIMO antenna array 200 is downlink precoded by modified phase excitation, and a transceiver 220 comprised in the BTS 110 is caused to create an antenna beam by providing different phase for each antenna element 210 of the MIMO antenna array 200.

The same, or separate, downlink precoding may be utilised for control plane and user plane according to different embodiments.

The transceiver 220 may be caused to transmit control plane signals in omni directional or sector directions, and UE plane signals in UE dedicated beams in some embodiments.

According to some embodiments, downlink precoders 230, 240 may be selected so that transmission layers may be de-correlated in spatial directions or with orthogonal polarizations.

Action 1302

This action may be comprised within some, but not necessarily all possible embodiments of the method 1300 in the BTS 110.

An Angle of Arrival (AoA) of the strongest spatial directions for uplink signals from the UE 120 may be detected.

The detection of the strongest angle of arrival may comprise detection of the spatial directions with a signal to noise and interference ratio for uplink signals from the UE 120 exceeding a threshold value.

However, in some embodiments, the angle of arrival of the strongest spatial directions for uplink signals from the UE 120 may be detected by receiving Precoding Matrix Indicator (PMI) feedback from the UE 120.

In some embodiments, the angle of arrival of uplink signals from the UE 120 may be detected by receiving uplink signals, directly or indirectly from the UE 120 via scattering reflections. The received uplink signals may be spatially analyzed. The spatial analysis of the received uplink signals may comprise a comparison between the received signal strength/quality with a predetermined threshold value. Some signals may then be selected, based on the spatial analysis and comparison.

According to some embodiments, the signals having a signal strength/quality exceeding a predetermined threshold value may be selected.

Having selected said signals, the Angles of Arrival (AoAs) for the selected signals may be determined. The AoAs may be determined by measuring the Time Difference of Arrival (TDOA) at individual antenna elements 210 of the multiple antenna array 200, according to some embodiments.

Action 1303

This action may be comprised within some, but not necessarily all possible embodiments of the method 1300 in the BTS 110, wherein action 1302 has been performed.

An Angle of Departure (AoD) may be determined, based on the detected angle of arrival.

Thus the angle of departure for signals to be transmitted may be determined, which AoD is corresponding to the previously determined 1302 AoA of the selected uplink signals from the UE 120. The AoD may thus comprise approximately the same angle as the previously determined AoA of the selected uplink signals, according to some embodiments, due to reciprocity. The determined angle of departure may be utilised for downlink UE-specific signalling in some embodiments.

Action 1304

A signal is transmitted in the antenna beam via the MIMO antenna array 200, to be received by the UE 120.

According to some embodiments, the signal may be transmitted in the antenna beam in the determined 1303 angle of departure for downlink UE-specific signalling.

In some embodiments, a wanted radio signal coverage, or cell coverage, may be achieved by creating different antenna beams from omni, semi omni, sector and/or dual beams with different spatial directions, dependent on environment and deployment of the BTS 110.

In some embodiments, a plurality of sectors with different spatial orientation may be created, by using a plurality of downlink precoders 230, 240 for different physical cells 720.

Figure 14:
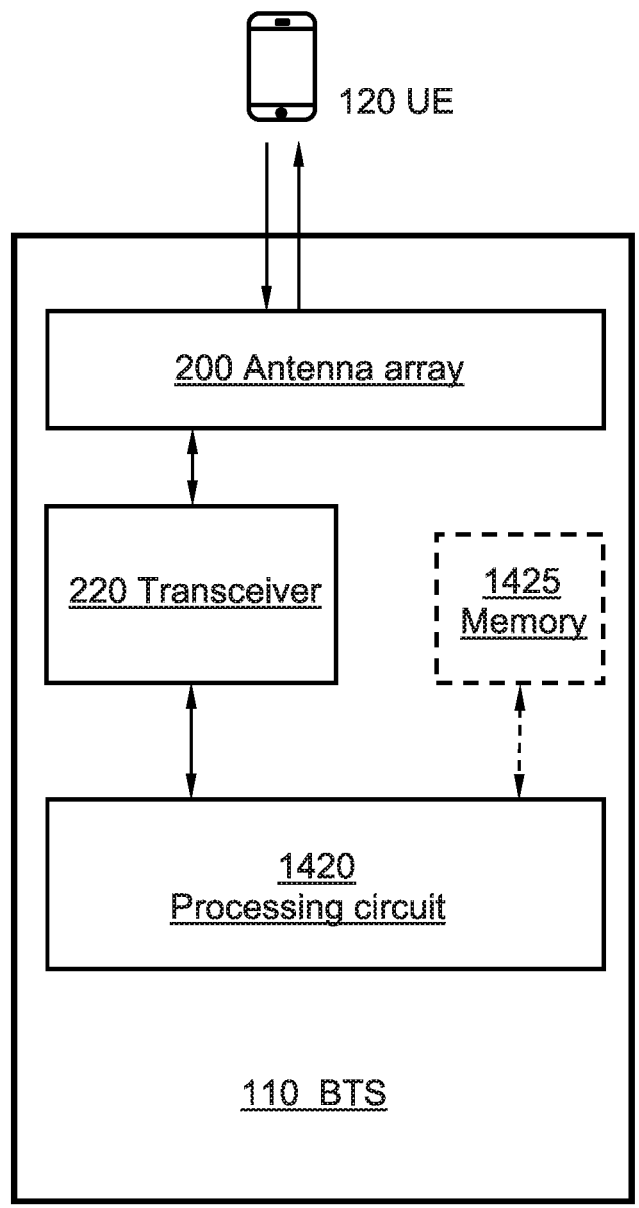
FIG. 14 is a block diagram illustrating the BTS according to an embodiment.

FIG. 14 is a block diagram illustrating a Base Transceiver Station (BTS) 110 in a wireless communication network 100. The BTS 110 is configured for performing the above mentioned method 1300 according to any, some or all of the actions 1301-1304 for wireless communication with a UE 120 in the wireless communication system 100, in antenna streams.

The radio network node no comprises, or is connected to, a MIMO antenna array 200 configured for beamforming, spatial multiplexing and MIMO transmission. The MIMO antenna array 200 comprises a multitude of antenna elements 210 such as e.g. a quadrature array with vertical polarized omni directional antenna elements 210 in single or several layers. In some embodiments, all antenna elements 210 of the MIMO antenna array 200 may be participating in creating the antenna beam. The antenna beam direction may be remotely configurable in some embodiments. Furthermore, the antenna beam direction may be time dependently configurable in some embodiments.

The wireless communication network 100 may be based on 3GPP LTE in some embodiments. Further, the wireless communication system 100 may be based on FDD or TDD. The radio network node no may comprise an eNodeB according to some embodiments.

For enhanced clarity, any internal electronics or other components of the BTS 110, not entirely essential for understanding the herein described embodiments have been omitted from FIG. 14.

The BTS 110 comprises a processing circuit 1420, configured for supporting same or separate downlink precoding for control plane and user plane by modifying phase excitation of the MIMO antenna array 200. The processing circuit 1420 is also configured for causing a transceiver 220 to create an antenna beam by providing different phase for each antenna element 210 of the MIMO antenna array 200.

The processing circuit 1420 may be further configured for creating a wanted coverage, different antenna beams from omni, semi omni, sector and dual beams with different spatial directions, dependent on environment and deployment of the BTS 110, in some embodiments.

In addition, the processing circuit 1420 may also be further configured for creating a plurality of sectors with different spatial orientation, using a plurality of downlink precoders 230, 240 for different physical cells 720.

Also, in addition, the processing circuit 1420 also may be further configured for causing the transceiver 220 to transmit control plane signals in omni directional or sector directions, and UE plane signals in UE dedicated beams.

The processing circuit 1420 may also be further configured for detecting an angle of arrival of the spatial directions with a signal to noise and interference ratio for uplink signals from the UE 120 exceeding a threshold value. Also, the processing circuit 1420 may also be further configured for determining an angle of departure, based on the detected angle of arrival and utilise the detected angle of departure for downlink UE-specific signalling.

Additionally, the processing circuit 1420 may further be configured for detecting the angle of arrival of the strongest spatial directions for uplink signals from the UE 120 by receiving Precoding Matrix Indicator (PMI) feedback from the UE 120.

Furthermore, the processing circuit 1420 may in addition also be configured for selecting downlink precoders 230, 240 so that transmission layers are de-correlated in spatial directions or with orthogonal polarizations.

The processing circuit 1420 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The herein utilised expression "processing circuit" may thus represent a processing circuitry comprising a plurality of processing circuits, such as, e.g., any, some or all of the ones enumerated above.

The processing circuit 1420 may further perform data processing functions for inputting, outputting, and processing of data comprising data buffering and device control functions, such as call processing control, user interface control, or the like.

Further, the BTS 110 also comprises a transceiver 220, configured for transmitting/receiving a signal in the antenna beam via the MIMO antenna array 200, to be received/ transmitted by the UE 120.

The transceiver 220 may be configured for transmitting signals in an AoD corresponding to, or based on, the AoA of selected uplink signals, to be received by the UE 120, in some embodiments.

Furthermore, the BTS 110 may comprise at least one memory 1425, according to some embodiments. The memory 1425 may comprise a physical device utilised to store data or programs, i.e., sequences of instructions, on a temporary or permanent basis. According to some embodiments, the memory 1425 may comprise integrated circuits comprising silicon-based transistors. Further, the memory 1425 may be volatile or non-volatile.

The previously described actions 1301-1304 to be performed in the BTS 110 may be implemented through the one or more processing circuits 1420 in the BTS 110, together with computer program code for performing the functions of the actions 1301-1304. Thus a computer program product, comprising instructions for performing the actions 1301-1304 in the BTS 110 may perform the method 1300 for wireless communication with a UE 120 in a wireless communication system 100, when the computer program product is loaded in a processing circuit 1420 of the BTS 110. Thus a computer program and a computer program product may comprise a program code for performing a method 1300 according to any of the described actions 1301-1304, when the computer program runs on a computer.

The computer program product mentioned above may be provided for instance in the form of a data carrier carrying computer program code for performing any, at least some, or all of the actions 1301-1304 according to some embodiments when being loaded into the processing circuit 1420. The data carrier may be, e.g., a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the BTS 110 remotely, e.g., over an Internet or an intranet connection.

The terminology used in the detailed description of the embodiments as illustrated in the accompanying drawings is not intended to be limiting of the described method 1300 and/or BTS 110, which instead are limited by the enclosed claims.

As used herein, the term "and/or" comprises any and all combinations of one or more of the associated listed items. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. The term "or" as used herein, is to be interpreted as a mathematical OR, i.e. as an inclusive disjunction; not as a mathematical exclusive OR (XOR), unless expressly stated otherwise. A single unit such as, e.g., a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

What is claimed is:

1. A Base Transceiver Station (BTS), wherein the BTS comprises:
   a Multiple Input Multiple Output (MIMO) antenna array configured for beamforming and MIMO transmission, wherein the BTS is configured for wireless communication with a User Equipment (UE) in a wireless communication system;
   a processing circuit, configured to implement a plurality of downlink pre-coders, wherein the plurality of downlink pre-coders are configurable to provide a remotely configurable downlink cell pattern, at least one of the plurality of downlink pre-coders is configured to provide downlink pre-coding for a UE dedicated channel corresponding to the UE, and at least one of the plurality of downlink pre-coders is configured to provide downlink pre-coding for a control plane, and wherein the downlink pre-coding that is provided by the plurality of downlink pre-coders is used to modify phase excitation of the MIMO antenna array, to cause a transceiver to create an antenna beam by providing a different phase for each antenna element of the MIMO antenna array; and
   the transceiver, configured to transmit a signal in the antenna beam via the MIMO antenna array to the UE.

2. The BTS according to claim 1, wherein the processing circuit is further configured to configure the plurality of downlink pre-coders to create the downlink cell pattern, wherein the downlink cell pattern comprises coverage from different antenna beams from omni, semi omni, sector and dual beams with different spatial directions, and wherein the downlink cell pattern is remotely configurable based on an environment and deployment of the BTS.

3. The BTS according to claim 1, wherein the processing circuit is further configured to configure the plurality of downlink pre-coders to create a plurality of sectors with different spatial orientation, wherein sectors of the plurality of sectors correspond to different physical cells.

4. The BTS according to claim 1, wherein the processing circuit is further configured to cause the transceiver to transmit control plane signals in omni directions or sector directions and UE plane signals using the UE dedicated beam.

5. The BTS according to claim 4, wherein the processing circuit is further configured to detect an angle of arrival of spatial directions based on a signal to noise and interference ratio for uplink signals from the UE exceeding a threshold value, and also configured to determine an angle of departure for downlink UE-specific signalling based on the detected angle of arrival.

6. The BTS according to claim 1, wherein the processing circuit is further configured to;
   detect angles of arrival of the strongest spatial directions for uplink signals from the UE by receiving Precoding Matrix Indicator (PMI) feedback from the UE; and
   determine an angle of departure for downlink UE-specific signalling based on the detected angle of arrival.

7. The BTS according to claim 1, wherein the processing circuit is further configured to select downlink pre-coders of the plurality of downlink pre-coders to cause transmission layers to be de-correlated in spatial directions or with orthogonal polarizations.

8. The BTS according to claim 1, wherein the MIMO antenna array comprises a quadrature array with vertical polarized omni directional antenna elements in single or several layers.

9. The BTS according to claim 1, wherein the MIMO antenna array comprises a quadrature array with vertical and horizontal polarized monopole omni directional antenna elements in single or several layers.

10. The BTS according to claim 1, wherein an antenna beam direction is time dependently configurable.

11. The BTS according to claim 1, wherein all antenna elements of the MIMO antenna array participate in creating the antenna beam.

12. A method in a Base Transceiver Station (BTS), the method comprising:
  determining a downlink cell pattern for a Multiple Input Multiple Output (MIMO) antenna array comprised in the BTS, wherein the MIMO antenna array is configured for beamforming and MIMO transmission, and the BTS is configured for wireless communication with a User Equipment (UE) and wherein the downlink cell pattern is remotely configurable;
  configuring at least one downlink pre-coder of a plurality of downlink pre-coders according to the downlink cell pattern, wherein a first downlink pre-coder the plurality of downlink pre-coders is configured to provide downlink pre-coding for a UE dedicated channel corresponding to the UE, and a second downlink pre-coder of the plurality of downlink pre-coders is configured to provide downlink pre-coding for a control plane;
  performing downlink precoding according to the plurality of downlink pre-coders by modifying phase excitation of the MIMO antenna array and causing a transceiver to create an antenna beam by providing a different phase for each antenna element of the MIMO antenna array; and
  transmitting a signal in the antenna beam via the MIMO antenna array to be received by the UE.

13. The method according to claim 12, wherein the method further comprises:
  detecting an angle of arrival of the strongest spatial directions for uplink signals from the UE; and
  determining an angle of departure for downlink UE-specific signalling based on the detected angle of arrival, wherein the signal is transmitted in the antenna beam in the determined angle of departure for the downlink UE-specific signalling.

14. A non-transitory computer-readable storage medium storing a program to be executed by a processor, the program including instructions for:
  determining a downlink cell pattern for a Multiple Input Multiple Output (MIMO) antenna array comprised in a base station that comprises the non-transitory computer-readable storage medium, wherein the MIMO antenna array is configured for beamforming and MIMO transmission, and the base station is configured for wireless communication with a User Equipment (UE), and wherein the downlink cell pattern is remotely configurable;
  configuring at least one downlink pre-coder of a plurality of downlink pre-coders according to the downlink cell pattern, wherein a first downlink pre-coder the plurality of downlink pre-coders is configured to provide downlink pre-coding for a UE dedicated channel corresponding to the UE, and a second downlink pre-coder of the plurality of downlink pre-coders is configured to provide downlink pre-coding for a control plane;
  performing downlink precoding according to the plurality of downlink pre-coders by modifying phase excitation of the MIMO antenna array and causing a transceiver to create an antenna beam by providing a different phase for each antenna element of the MIMO antenna array; and
  transmitting a signal in the antenna beam via the MIMO antenna array to be received by the UE.

15. The non-transitory computer-readable storage medium according to claim 14, Wherein during a first time period the downlink cell pattern comprises an omni directional beam coverage, and during a second time period the downlink cell pattern comprises a sector beam coverage.

16. The non-transitory computer-readable storage medium according to claim 14, wherein the downlink cell pattern is configured by an operator according to a physical environment in which the base station is located.

17. The non-transitory computer-readable storage medium according to claim 14, wherein the downlink cell pattern is configured according to a statistical analysis of traffic of the base station.

18. The non-transitory computer-readable storage medium according to claim 14, wherein the downlink cell pattern comprises at least four spatially separated cells.

* * * * *